United States Patent
Sharon et al.

(10) Patent No.: US 10,019,680 B2
(45) Date of Patent: Jul. 10, 2018

(54) SYSTEM AND METHOD FOR DISTRIBUTED RULE-BASED SEQUENCING ENGINE

(71) Applicant: NICE-SYSTEMS LTD., Ra'anana (IL)

(72) Inventors: Dan Sharon, Kfar Saba (IL); Eitan Kovacs, Netanya (IL); Igor Cher, Rehovot (IL)

(73) Assignee: NICE LTD., Ra'anana (IL)

( * ) Notice: Subject to any disclaimer, the term of this patent is extended or adjusted under 35 U.S.C. 154(b) by 753 days.

(21) Appl. No.: 14/551,090

(22) Filed: Nov. 24, 2014

(65) Prior Publication Data

US 2016/0048778 A1  Feb. 18, 2016

Related U.S. Application Data (60) Provisional application No. 62/037,625, filed on Aug. 15, 2014.

(51) Int. Cl.
*G06Q 10/00* (2012.01)
*G06Q 10/06* (2012.01)

(52) U.S. Cl.
CPC .................. *G06Q 10/063* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,014,647 A * | 1/2000 | Nizzari | ................... | G06Q 20/10 705/39 |
| 7,197,489 B1 * | 3/2007 | Gauvin | ............... | H04L 41/0233 |
| 7,801,749 B2 * | 9/2010 | Lynn | ...................... | G06Q 10/00 705/2 |
| 7,953,219 B2 * | 5/2011 | Freedman | .............. | G06Q 30/02 379/265.06 |
| 8,103,531 B2 * | 1/2012 | Wollan | ................. | G06Q 10/063 705/7.11 |
| 8,571,203 B2 * | 10/2013 | Knott | ................ | H04M 3/42348 379/265.01 |
| 8,630,892 B2 * | 1/2014 | Bhalla | .................... | G06Q 30/02 705/7.31 |
| 8,805,849 B1 * | 8/2014 | Christensen | ........ | G06F 11/1446 707/640 |
| 8,909,590 B2 * | 12/2014 | Newnham | ............ | G06N 99/005 706/52 |

(Continued)

OTHER PUBLICATIONS https://en.wikipedia.org/wiki/Apache_HBase.*
https://blogs.igalia.com/dpino/2012/10/31/introduction-to-hbase-and-nosql-systems/.*

*Primary Examiner* — Alan S Miller
(74) *Attorney, Agent, or Firm* — Pearl Cohen Zedek Latzer Baratz LLP (57) ABSTRACT

A computing device including a processor and memory may receive input from a user to define one or more sequence types, each sequence type based on a time frame. A distributed computing system may receive interaction data on a plurality of computing nodes and describing an interaction event between a customer and an agent. The one or more computing nodes may associate the received interaction event with the customer's identifier in a customer history table, wherein the customer history table stores historical interaction events for the customer. Further, the computing nodes may assign the received interaction event to a sequence, based on the defined one or more sequence types.

20 Claims, 6 Drawing Sheets

(56) References Cited

U.S. PATENT DOCUMENTS

| | | | | |
|---|---|---|---|---|
| 8,914,314 | B2* | 12/2014 | Newnham | G06N 5/04 706/12 |
| 9,183,272 | B1* | 11/2015 | Jonsson | G06F 17/30418 |
| 9,232,063 | B2* | 1/2016 | Romano | H04M 3/5175 |
| 2002/0072921 | A1* | 6/2002 | Boland | G06Q 10/063 709/206 |
| 2004/0049504 | A1* | 3/2004 | Hellerstein | G06F 17/3061 |
| 2005/0105712 | A1* | 5/2005 | Williams | G10L 13/027 379/265.02 |
| 2006/0129605 | A1* | 6/2006 | Doshi | G06F 8/24 |
| 2006/0212486 | A1* | 9/2006 | Kennis | G06F 17/30569 |
| 2006/0271507 | A1* | 11/2006 | Anzalone | G06F 17/30592 |
| 2007/0005388 | A1* | 1/2007 | Busch | G06Q 10/06 719/318 |
| 2007/0038651 | A1* | 2/2007 | Bernstein | G06F 17/30587 |
| 2007/0100679 | A1* | 5/2007 | Wollan | G06Q 10/063 705/7.29 |
| 2007/0203717 | A1* | 8/2007 | Hutchison | G06Q 99/00 379/111 |
| 2008/0052374 | A1* | 2/2008 | Powers | G06Q 10/10 709/217 |
| 2008/0189171 | A1* | 8/2008 | Wasserblat | G06Q 10/063 705/7.32 |
| 2008/0306952 | A1* | 12/2008 | Lynn | G06Q 10/00 |
| 2009/0150152 | A1* | 6/2009 | Wasserblat | G06F 17/30746 704/254 |
| 2010/0318370 | A1* | 12/2010 | Bhattacharyya | H04L 41/0273 705/1.1 |
| 2010/0318400 | A1* | 12/2010 | Geffen | G06Q 30/016 705/304 |
| 2010/0332477 | A1* | 12/2010 | Jeffs | G06Q 30/02 707/738 |
| 2011/0093509 | A1* | 4/2011 | Fan | G06Q 30/02 707/803 |
| 2012/0130771 | A1* | 5/2012 | Kannan | G06Q 10/06398 705/7.32 |
| 2012/0239558 | A1* | 9/2012 | Zhang | G06Q 40/00 705/39 |
| 2012/0259851 | A1* | 10/2012 | Jia | G06Q 30/0242 707/737 |
| 2013/0054306 | A1* | 2/2013 | Bhalla | G06Q 30/02 705/7.31 |
| 2013/0080377 | A1* | 3/2013 | Newnham | G06N 99/005 706/52 |
| 2013/0110750 | A1* | 5/2013 | Newnham | G06N 99/005 706/12 |
| 2014/0095505 | A1* | 4/2014 | Blanchflower | G06F 17/30091 707/737 |
| 2014/0280172 | A1 | 9/2014 | Amir et al. | |
| 2015/0039521 | A1* | 2/2015 | Schubert | G06Q 30/016 705/304 |
| 2015/0074043 | A1* | 3/2015 | Amir | G06Q 10/06 707/609 |
| 2015/0100526 | A1* | 4/2015 | Newnham | G06N 99/005 706/12 |
| 2015/0189086 | A1* | 7/2015 | Romano | H04M 3/5175 379/265.09 |

\* cited by examiner

SYSTEM AND METHOD FOR DISTRIBUTED RULE-BASED SEQUENCING ENGINE

CROSS-REFERENCE TO RELATED APPLICATIONS

This application claims the benefit of U.S. Provisional Patent Application No. 62/037,625, filed Aug. 15, 2014, the entirety of which is incorporated by reference herein.

FIELD OF THE PRESENT INVENTION

The present invention relates to data analysis and sequence generation on parallel computing systems

BACKGROUND

In customer engagement analytics platforms, sequencing may be a process of grouping customer interactions according to the interactions' timelines. A sequence of interactions may describe the journey or story of a customer as he or she seeks to resolve an issue with a business or service. Businesses may use these sequences to understand how best to improve its services or goods or how to better serve customer issues with a product. Sequencing or grouping interactions may be based on pre-defined rules that describe which interactions should be sequenced together. The rules may describe the types or channels of interactions which are part of a sequence and may describe interactions which occur in a specific time frame or period, or which resolve a particular issue (e.g., a billing mistake or a product defect). Several rules may be used to determine whether interactions describe one sequence or whether the interactions describe a different sequence or journey.

Sequencing of interactions may typically be limited to a specific interactions channel, such as an electronic communication format (e.g., a sequence may only describe email interactions or only phone interactions). The rules that govern the sequencing process may require further development or programming to accommodate new interaction types on, for example, a new channel (e.g., a SMS-based interaction) or a new issue (e.g., problems based on a new product launch). Scaling the sequencing process may be limiting when large amounts of interaction data must be sequenced. Moreover, it may be difficult to track key performance indicators (KPI's) across interactions placed in different sequences.

SUMMARY

A computing device including a processor and memory may receive input from a user to define one or more sequence types, each sequence type based on a time frame. A distributed computing system may receive interaction data on a plurality of computing nodes and describing an interaction event between a customer and an agent. Interactions can also describe a self-service event such as IVR or Web. The one or more computing nodes may associate the received interaction event with the customer's identifier in a customer history table, wherein the customer history table stores historical interaction events for the customer. Further, the computing nodes may assign the received interaction event to a sequence, based on the defined one or more sequence types.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, the "web" may refer to the World Wide Web, which may include the Internet and/or an Intranet. The web may be used interchangeably with the Internet and/or Intranet, as the web is a system of interlinked hypertext documents and programs (e.g., VOIP (voice over Internet protocol) telephone programs, streaming media programs) accessed via the Internet and/or Intranet.

When used herein, a "distributed" file system or computing system may include any cluster or network of computers used to perform computing tasks, such as logic, processing, reading/writing of data, or other tasks. The network of computers may be connected through an internal intranet or public internet. The network of computers may be connected to a central or master processor which assigns tasks to each computer on the network, or node. Each computer may further include their own processors to perform tasks locally. Distributed processing systems may be especially suitable for processing large data sets, since the tasks distributed on each node may be processed in parallel. A programming model for processing large data sets on distributed systems may be the map-reduce method, a well-known method in the prior art. The map-reduce method may include steps of "mapping" input data into smaller units to be processed across multiple computing nodes and then "reducing" the processed input to form output data. Mapping operations may include filtering and sorting data across computer nodes, and reducing may include aggregating the processed data units from the computing nodes and outputting the combined data. According to embodiments of the invention, a data processing or management system may receive and process interaction data on a distributed file system, and further generate or determine sequences from the interaction data. The distributed file system may utilize a plurality of computing nodes. Many distributed filing systems exist, including, for example, the Hadoop framework. Hadoop may provide a software framework that allows for the distributed processing of large data sets across clusters of computers using a simple programming model. Hadoop may be designed to scale up from a single server to thousands of machines, each offering local computation and storage. Instead of relying on the hardware of a few computers to deliver high-availability services, the Hadoop framework may detect and handle failures at the application layer, thus allowing a highly-available service on top of a cluster of computers, each of which may have risks for failures. Further, performance may be linearly scaled based on how many nodes are utilized in processing. For example, adding nodes may reduce performance time in a linear and predictable manner. HBase is a distributed and scalable database which may be used to implement embodiments of the invention; HBase may allow hosting of very large tables, e.g. billions of rows by millions of columns, on distributed memory devices.

Embodiments of the invention may use a distributed file system or a distributed computing system to build, generate, or determine sequences from a large data set describing one or more interaction events. A distributed rule engine, e.g., a rule engine or system that is implemented on a distributed computer system may evaluate defined rules to evaluate interaction events and build or generate sequences based on the rules. The interaction may be stored on a distributed file system using HDFS, for example, and a sequencing process may occur over multiple computing nodes using a Hadoop map/reduce programming model, for example. The sequencing process according to embodiments of the invention may be able to process interactions from difference sources in different formats without any code change. Embodiments of the invention may provide easy configuration for both input channels and sequencing rules. Moreover, processing these interactions using an embedded rule engine on distributed cluster nodes may enable sequencing of very large data in a few minutes. Interactions may be where two or more parties exchange information with each other over an electronic medium, (e.g., email, telephone, website lookup) and may be for the purposes of a transaction, complaints, a request, or information gathering, for example. An interaction can also be a self-service interaction.

A sequence may be a group of one or more interaction events involving or including the same customer. The interaction events when in the sequence may be in chronological order, from earliest to latest, for example. The group of interaction events may be deemed or determined to be a sequence based on interrelated or common attributes of the interaction events. For example, the interaction events which are grouped into one sequence may have the same subject or contact reason, such as a billing question, a complaint, a technical problem, or general feedback. Or, interaction events grouped into a sequence or journey may involve or include the same agent assisting the customer through different contact reasons. Different sequences may be determined or generated based on defined sequence types. A sequence type may be defined based on, at least a time frame or time period for a sequence, e.g., three days, a week, or a month. Other time frames may be possible. A defined time frame or period may help to limit the number of historical interaction events to process in order to generate a sequence. A sequence type may further be defined, described, or expressed based on one or more communication channels of interaction events, a contact reason, sentiment, transaction amount, or other attributes that describe an interaction event. Sequences may describe a "journey" or provide a narrative for how a customer resolves various issues. Sequences may be further analyzed using key performance indicators (KPI's), which may further allow businesses to predict customer behavior based on cross-channel interaction sequences over all of their customer data.

Interactions may be recorded or stored that take place between a customer and one or more agents or service representatives over different multiple communication channels, such as the customer accessing an online support website, calling a call center, text messaging (communicating via text messaging), or through social media websites such as the Facebook social networking service, the Twitter social networking service, or the Foursquare social networking service, for example. The recorded interactions may have many different media types, such as, voice recordings, SMS messages, text messages, web screenshots, etc. The recorded interactions may be stored as raw data or may be processed, for example, by extracting information from the interactions according to predefined rules and known analytical methods such as text or speech processing. An interaction via the Internet between two parties may be any communication occurring between devices via the Internet. The interaction performed by devices may facilitate communication between two parties which are human users, such as a customer and a service representative, or allow a user to access content or media on the web, and may be between a human and a party which is an automated process (e.g., some interactions may only have one participant). For example, a user or customer may have questions about a service, and ask questions to a chat bot or automated chatting service that provides answers to the customer. A single user may also be one party interacting with another party that is a computer or device controlled by an organization, such as by completing a survey. Communication between people on the Internet may include e-mail messages, instant messaging, blogging, VOIP or posting messages on social networking websites. Each of these may be defined as different communication channels, or they may be grouped and defined as an Internet communication channel. Accessing content on the web may include browsing news websites, accessing video content, or downloading music content. Other forms of interactions may occur between parties. Although some embodiments are directed to interactions between a customer and an agent or customer service representative, the sequencing process disclosed may be applied to other kinds of interactions across different communication channels, such as interactions during transactions, or multi-party discussions and negotiations between businesses.

In an interaction, two or more people (e.g., a customer and an agent) may exchange information electronically, or a person may exchange information with an automated process such as a chat bot. The interactions may occur across different types of communication channels including, for example, Internet, Intranet, public network, private network, local area network, wide area network, messaging via text messaging, short message service (SMS) messaging, e-mail messaging, blogs or micro-blogs, radio, and telephone or calling channels. Interactions may be recorded as raw interaction data and processed into individual interaction events. Raw interaction data may be extracted or processed information from each interaction, according to known content analysis methods, such as text and speech extraction. Raw interaction data may include metadata or content from the interaction. If the interaction occurs over the Internet, for example, the raw interaction data may be extracted from IP data packets or html, for example. Raw interaction data may result from speech processing the recording of an interaction, such as a call over the telephone, or text processing a conversation over Twitter, for example. The raw interaction data may be processed into interaction events so that it can be read, evaluated, and sequenced by embodiments of the system and method described herein. The interaction events may be a segment or fragment of an interaction (or, may describe the entire interaction) and may include distilled information from the interaction, such as a customer identification (ID), agent ID, start time, end time, communication channel, sentiment, contact reason, whether an issue was resolved, or other attributes of the interaction. Since interaction events with the same customer may occur contemporaneously over different communication channels, or multiple interaction events may occur successively in one interaction, the interaction events may optionally be grouped into an interaction session. For example, an interaction involving one customer may include two telephone calls with two different agents on one channel, a web-browsing session which may take place on a second channel, and a text interaction which may take place on a third channel. Since these four interaction events may occur in a short time frame, e.g., within ten minutes, these four interaction events may optionally be grouped into an interaction session. The interaction events or session may be assigned to a sequence, depending on defined sequence types.

Figure 1:
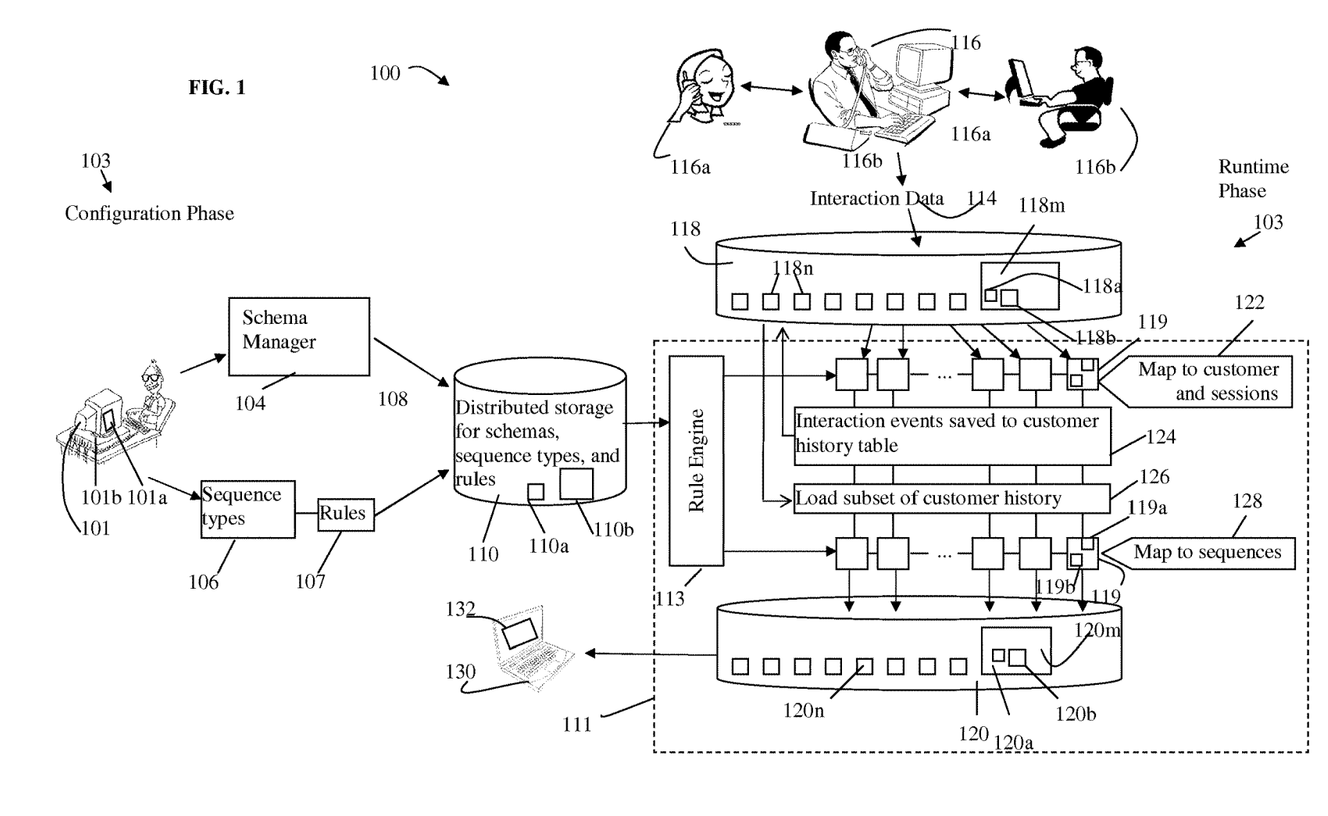
FIG. 1 is an illustration of a system for generating sequences from interaction data, according to embodiments of the invention.

FIG. 1 is an illustration of a system 100 for generating sequences from interaction data, according to embodiments of the invention. Data processing system 100 may receive interaction data 114 generated by interactions between a customer service representative 116 and a customer 116a, 116b. Other types of parties may interact and generate interaction data 114 from recorded interactions. The interaction data 114 may be generated through multiple types of communication channels, such as via telephone lines (as shown between customer 116a and representative 116) or via the Internet or web (as shown between customer 116b and representative 116), or both channels. Other channels may be used, such as VOIP or facsimile, for example. The interaction data may be received and saved in a distributed storage system 118 such as a distributed memory system or distributed database running HBase, for example. The distributed storage system 118 may store the interaction data across multiple computing nodes 118n for later evaluation, or the interaction data 114 may be immediately distributed for evaluation. The distributed storage system 118 may include a master node 118m that distributes the task of writing the interaction to a local storage across the nodes 118m. The master node 118m may include a local processor 118a and memory 118b to distribute computing tasks. Each computing node 118n included in distributed storage system 118 may include a local processor and memory similar to master node 118m. The stored interaction data may be loaded (e.g. transferred to and/or stored in) across other computing or evaluation nodes 119 used for evaluation, for example. Each computing node 119 may include a local processor 119a and memory 119b for executing software loaded from the rule engine 113 to evaluate or apply sequencing rules to the distributed interaction data.

During a configuration phase 103, a computer 101, including a processor 101a and memory 101b, may be accessed by a user, engineer, or analyst to define schemas of interaction data in a schema manager 104. The analyst may write schemas in a markup language such as XML (extensible markup language), and input or edit the files into the schema manager 104. A schema may be a template of interaction data that lists common characteristics, attributes, or structure of different types of interaction data. Schemas may be edited or changed more easily than source code for processing new types of interaction data, due to inheritance hierarchies. The schema manager 104 may include a user interface. Computer 101 may further use an application to define sequence types 106 or rules 107 that define what kinds of interaction events may be grouped into a sequence. The sequence types 106 and rule 107 may be based on the schemas, which hierarchically define characteristics and attributes for different types of interactions. Sequence types may also be written in an XML language and include different or attributes categories of interactions that describe or define sequences. The categories or attributes to include in a sequence type may depend on which customer journeys are valuable or detrimental to a business. For example, the sequence types may describe or be based on a time frame or time period, contact reason or category, and communication channels of interaction events which may be grouped together as a sequence. A sequence that is important to a cell phone service company may be groups of email and phone call interactions which result in a customer's cancellation of service. A business analyst may include these attributes or characteristics in a XML file representing a sequence type. Other logic may be written to the XML file to define, describe, or express a sequence type. Logic operations may include "and", "or", "not", sequence operators (e.g., emails occurring prior to phone calls.

The rules 107 may define or describe algorithms to calculate or determine key performance indicators (KPI's) over the interaction events in the sequences. The rules may calculate the KPI's for each interaction event or for each generated sequence. The application for defining sequence types 106 and rules 107 may include a graphical user interface for editing and creating the rules, so that the user of computer 101 may not be required to have a technical background. The rules 107 may further be used to define export schema of the sequencing service, so that different clients (e.g. a client application computing device 130 can receive a different set of results from the same sequencing rule engine. The schema manager 104 and the application for defining sequence types 106 and rules 107 may run or be executed on the same computer or device. For every schema created, a class, such as a Java class, may be generated or created that defines methods and characteristics that an instance of the class would have. Other classes may be created based on the object-oriented programming language utilized, such as C++, or C#, for example. In other embodiments, classes need not be used. Based on the sequences types 106 and rules 107 created, code, programs, or methods may be generated or created that use the generated class to apply the rules or sequences types to interaction data More detailed information may be found in, for example, U.S. Patent Publication 2014/0280172, incorporated herein by reference. The generated code based on the defined schemas, sequence types, and rules may be stored in a database or storage 110, which may execute HBase, on processor or distributed processors 110*a* and memory or distributed memory 110*b*.

During runtime initialization, the generated code stored in storage 110 may be loaded to (e.g. transferred to and/or stored in) the rule engine 113, which may run or be executed on each computing node 119. The generated code loaded to rule engine 113 may apply sequence types or KPI rules to the interaction data distributed across each computing node 119. The received interaction data may be mapped or distributed across several computing nodes 119 for evaluation.

During a sequencing runtime phase 111, an interaction service may initially implement a map-reduce algorithm or other algorithm to process the received interaction data 114 into interaction events based on, for example, the schemas in storage 110. The interaction service may store the interaction events in database 118, for example. The interaction service may send a message to a message queue (e.g., active message queue 208 in FIG. 2) which distributes messages to a sequencing service 111. Distributed file system 118 may distribute processing of interaction data across multiple computing nodes 119 to map the interaction events to customers and sessions 122 through parallel processing. The computing nodes 119 may be different from nodes 118*n* or they may use the same processing resources. The computing nodes 119 may each have local processors 119*a* and memory 119*b*. The sequencing service 111, via computing nodes 119, may save the interaction events to a customer history table 124, which may save and sort all received interaction events for example by customer ID and in chronological order (e.g., earliest to latest) according to, for example, the start time of the interaction event. The computing nodes 119 may further retrieve or load 126 a subset of previous or historical interaction events for each customer involved in the received interaction events. The subset may be retrieved from database 118. The subset of interaction events may include interaction events occurring within a maximum time frame described by the sequence types 106. For example, if two sequence types are defined with a time frame of 3 days and 7 days respectively, a maximum time frame of the sequence types may be 7 days. The subset of interaction events retrieved from customer history may thus be the previous 7 days of customer history instead of, for example, the previous 2 years of customer history. Alternatively, a maximum time frame for a subset of interaction events may be explicitly defined by a user.

The retrieved subset of historical interaction events for each customer and the interaction events from received interaction data 114, may be mapped into sequences 128, based on the defined sequence types 106. Each sequence may include a sequence identifier associated with one or more interaction events ordered chronologically. The sequence may be represented by a row in a table or database or by a linked list, for example. Each generated sequence result may be written to and stored in distributed storage system 120 via parallel processing. Each evaluation node 119 may, in parallel, write to local storage (e.g., 119*b*) on each node 119, or may write the data to another distributed storage system 120. The distributed storage system may store each sequence and its associated interaction events across different storage nodes 120*n*. A master node 120*m* may communicate with all the different storage nodes 120*n* and distribute tasks across nodes 120*n*. Alternatively, distributed storage system 118 and 120 and evaluation nodes 119 may be part of the same distributed file system or be split into multiple other storage systems.

The stored sequences may be exported to a computing device 130 with a graphical user interface 132 (and displayed on a monitor, for example). The computing device 130 may be connected or coupled to the distributed storage system 120 and may execute or run client applications that identify or illustrate trends in a business's customer service. The client applications may further allow other KPI calculations or data analysis to optimize its customer service structure and management.

Computers 101, 116, 118 and 120 may each include one or more controller(s) or processor(s) 101*a*, 116*a*, 118*a* and 120*a*, respectively, for executing operations and one or more memory unit(s) 101*b*, 116*b*, 118*b* and 120*b* respectively, for storing data and/or instructions (e.g., software) executable by a processor. Processors 101*a*, 108*a*, and 114*a* may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 101*b*, 116*b*, 118*b* and 120*b* and/or local caches and memory in cluster nodes 118*n*, 120*n*, and 119 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Computers 101 and 116 may include one or more input devices, for receiving input from a user or agent (e.g., via a pointing device, click-wheel or mouse, keys, touch screen, recorder/microphone, other input components) and output devices for displaying data to a customer and agent, respectively.

Figure 2:
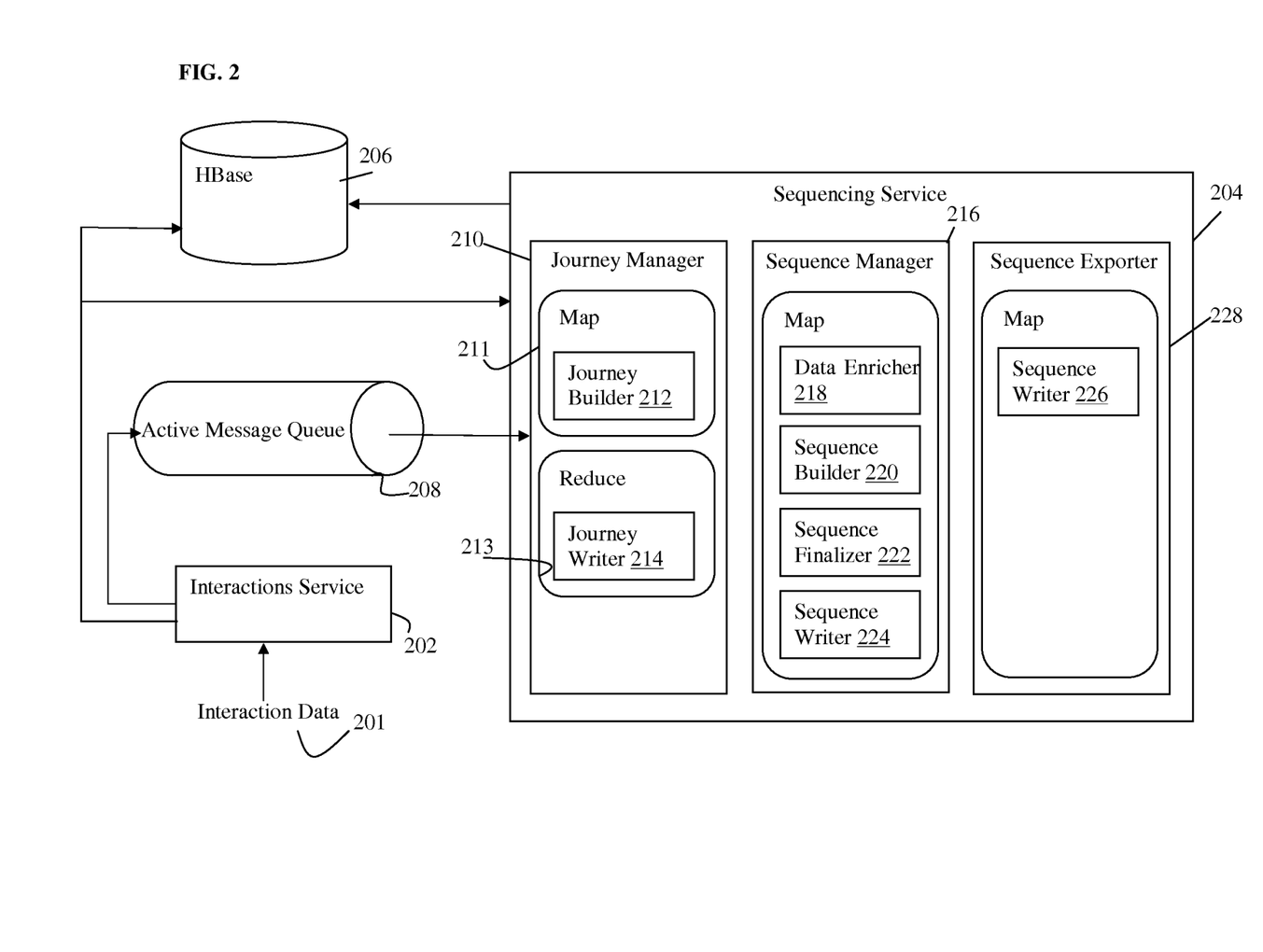
FIG. 2 a diagram of data flow between an interactions service and a sequencing service, according to embodiments of the invention.

FIG. 2 is a diagram of data flow between an interactions service 202 and a sequencing service 204, according to embodiments of the invention. Interactions service 202 may receive a batch of raw interaction data 201 representing or describing interactions between customers and agents. The interactions service 202 may process the interaction data 201 into interaction events by, for example, extracting information according to predefined rules (e.g., categorization rules) and known analytical methods (e.g., speech processing). The interactions service 202 may load the interactions data 201 and stores it in a distributed database. The interaction events may be stored in a separate distributed database 206 using Hbase, for example. Once the interaction events are extracted, the interactions service 202 may send a message to a message queue 208 (e.g., active message queue) about a new interactions batch. The sequencing 204 service may be listening or monitoring the message queue for a message regarding the new batch of interactions. Once this message is received the sequencing service 204 may begin the sequencing process. The sequencing service 204 may be implemented by, for example, rule engine 113 in FIG. 1, which may be executed or run on a plurality of computing nodes (e.g., computer nodes 119).

Sequencing service 204 may include a journey manager module 210 which may perform a map/reduce job (e.g., using the Hadoop software framework). The map/reduce job may group interaction events into interaction sessions, move interaction events' metadata (e.g., agent, categories etc.) to the grouped sessions' level, aggregate the sessions by customer and save them in customer history tables (e.g., databases). The map/reduce job may create and fill a customer update table and send it to a sequence manager module 216. In a mapping phase 211, a journey builder 212 sub-module may aggregate interaction segments or events into complete sessions and move event metadata, such as agent, categories, and content data, to the complete level. In a reduce phase 213, journey writer 214 sub-module may aggregate the sessions by customer and write new interaction events to the customer history table and to a customer update table. A customer history table may include all the historical interaction events involving each customer. The customer history table may group together all interaction events associated with the same customer and order them chronologically. Each row of the table may represent an interaction event and include a key ID that is a concatenation of a Customer Profile ID, Session Start Time, Event Type, and optionally, a Session ID. The interaction event may further include other metadata or column values associated with the event's key ID. The column values or metadata may include, for example (other or different data may be included):

System ID—the ID of the external system from which the interaction arrived
Session ID—the interaction (session) ID
Channel type ID—the ID of the channel (Voice, Web, Email etc.)
Duration—the duration of the interaction in milliseconds, calculated by the difference between end time and start time
End time UTC (Coordinated Universal Time)—the end time of the interaction
Start time UTC—the start time of the interaction
Contact Reason ID—reason for interaction between customer and agent, such as technical problem, billing question, compliment, feedback, or other reasons Other metadata or columns may be present in the customer history table. The columns may be defined by, for example, schemas, using a schema manager (e.g., schema manager 104 in FIG. 1).

The customer update table or database may be a temporary table that the next module, a sequence manager module 216, reads as an input. Journey writer 214 may write all newly received interaction events to the customer update table based on a new batch of interaction data 201. Each row in the customer update table may describe or represent the new interaction events associated with a customer. The first column, for example, may identify the customer (with a customer ID, for example), and the second column to nth column may identify the start times of each new interaction event (e.g., n interaction events).

Sequence manager module 216 may receive the customer update table from journey manager module 210 and build sequences based on the customer update table and customer history table stored in distributed database 206. Sequence manager module 216 may include four sub-modules (other modules and number of modules may be possible). Data enricher 218 sub-module may update a customer profile with the new interaction events. A customer profile may be an object that includes all customer data, interaction events, sequences, sequence types and categories associated with each customer. The customer profile may provide sequence builder 220 all available information about the customer so that it can build sequences based on any criteria (e.g., criteria defined by sequence types). Data enricher 218 may enrich customer or agent attributes or characteristics based on the new interaction events.

Sequence builder 220 may create or generate the sequences based on the predefined sequence types and rules. For example, the sequence types may define a sequence as all interactions which are 3 days apart from each other. Another sequence type may define a sequence with only voice channel interactions that are 7 days apart from each other. Other logic and rules may be used in a sequence type, such as excluding all contact reasons that are related to billing issues. A sequence finalizer sub-module 222 may apply additional logic on the sequences to add dynamic or calculated fields determined by defined KPI's. One example of a KPI may be a FCR rule, or First Contact Resolution rule, indicating whether the agent handled the customer problem on the current interaction. This rule may also be customized: for example, if the agent who handled the first call is in a lower seniority level than the agent which handled the next call than the call sequence may still be counted as FCR. A sequence writer sub-module 224 of the sequence manager module 216 may write the determined sequences to a sequence update table. A sequence exporter module 228 may export sequences from the sequence update table to different client applications that present sequences to business analysts and may write sequences to other files, depending on the needs of client applications.

Sequence manager 216 may use the customer update table or database by first reading the customer ID of each row in the table. Using for example the customer ID, sequence manager 216 may access the customer history table for the identified customer and retrieve or fetch only relevant interaction events according to a maximum time frame or time period as defined by the sequence types. The sequence builder 220 may build the sequences based on defined sequence types by comparing attributes or characteristics between the retrieved interaction events (which include the newly received interaction events). For example, if a sequence type is defined as including all IVR (Interactive Voice Response) interactions and social media interactions within 5 days regarding returning a bought item, sequence builder 220 may read all IVR and social media interaction events relevant to returning bought items. The sequence writer 224 may then write each sequence to a sequence update table, where each row may be a sequence including a sequence ID and associated interaction events in chronological order. The sequence ID may be a concatenation of Customer Profile ID, Sequence Type, and/or Timestamp.

The table structure for the sequence table and customer update table may be dynamic, e.g., there may not be a specified number of columns. The tables may be stored in or as a database, and other forms for storing this and other information described herein may be used. Each table may store the interaction as it was configured by the analyst in accordance with the business needs. In some embodiments a dynamic structure may be achieved for example due to the No-SQL nature of HBase, and allows the introduction of new fields to the interactions without any code changes or schema changes. A dynamic structure may further provide the ability to store cross channel interactions in the same table, e.g., a voice channel interaction including start time and duration fields and an Email interaction including subject and body fields. The only common field between these interactions may be a unique sequence ID. Some embodiments need not use HBase.

While specific services and modules are described herein, in other embodiments the functionality of methods according to embodiments of the invention may be performed by other sets of modules and services. The processors 118*a*, 119*a*, and 120*a* may be configured to carry out methods according to embodiments of the invention described herein. The functionality of services (e.g., sequencing service 204 and interactions service 202) and modules (e.g., journey manager 210, sequence manager 216) may be carried out by processors 119a or 118a or computing nodes 119, for example.

Figure 3:
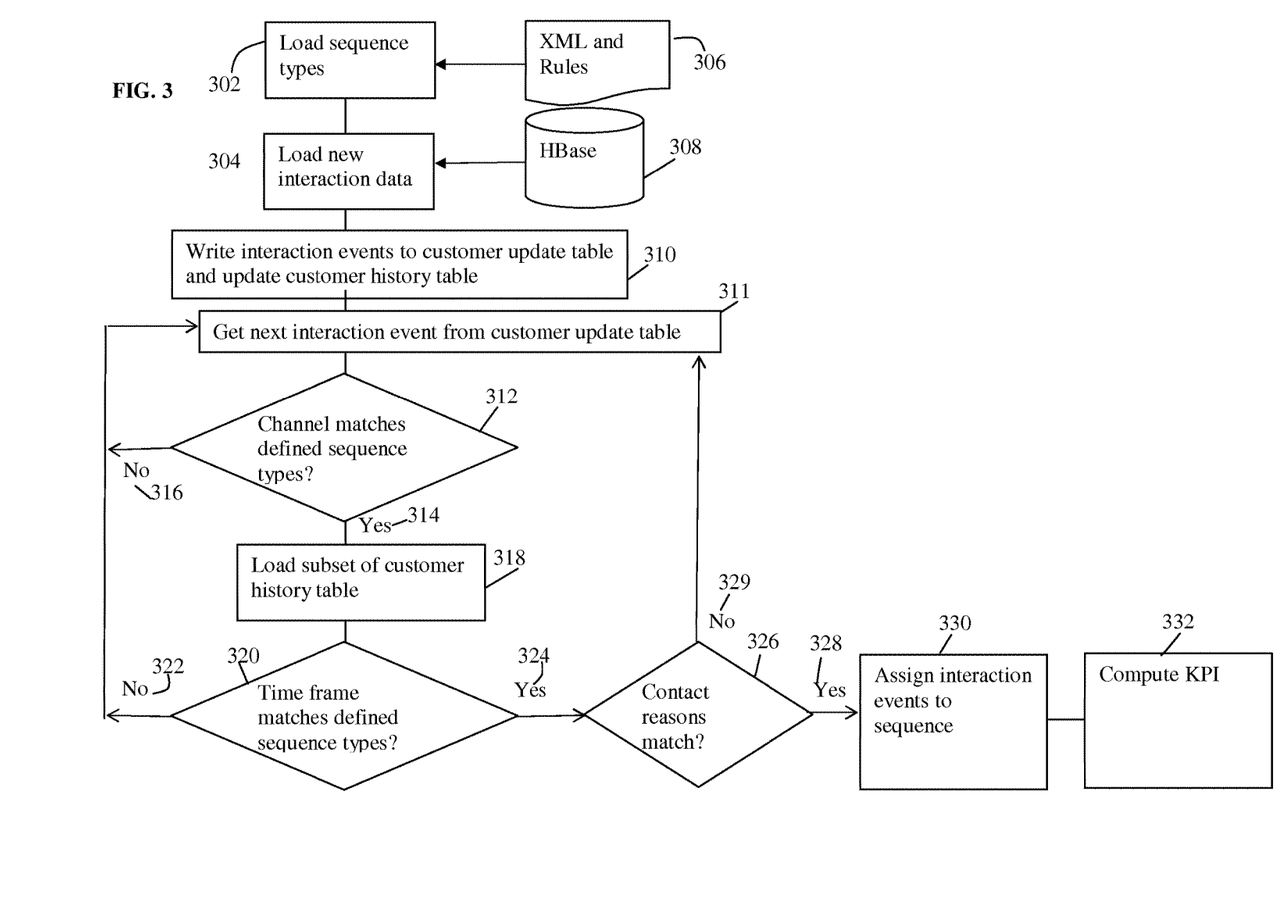
FIG. 3 is a flow diagram during a sequencing runtime method, according to embodiments of the invention.

FIG. 3 is a flow diagram showing execution during a sequencing runtime method, according to embodiments of the invention. During a runtime phase (e.g., sequencing runtime phase 111 in FIG. 1), a system for generating sequences (e.g., system 100 in FIG. 1) may initially load defined sequence types 302 (e.g., XML files including interaction characteristics and other logic) onto a sequencing rule engine (e.g., rule engine 113 in FIG. 1). The sequence types may be loaded based on XML files and rules 306 created by an analyst or engineer, for example. The system may further load a new batch of interaction data 304 from a distributed database 308 executing or running HBase, for example. Through parallel processing on a plurality of processing nodes (e.g., computing nodes 119 in FIG. 1), interaction data may be processed into separate interaction events. In step 310, the interaction events may be written or stored to a customer update table or database and a customer history table or database may be updated with the new interaction events. A customer update table may be a temporary table that is sent to, for example, a sequence manager module 216 (see FIG. 2). The customer update table may sort and associate all newly received interaction events which involve the same customer, e.g., interaction events involving the same customer may be grouped together in the customer update table. As explained in FIG. 2, each row of the customer update table may represent a customer and their associated new interaction events. The customer history table may include all previous interaction events sorted by customer in chronological order.

A sequence manager 216 may iterate or loop through each interaction event from the customer update table. In operation 311, a sequence manager 216 may get or read the next interaction event from the customer update table (when starting this loop, the sequence manager 216 may read the first interaction event in the customer update table). In step 312, the sequence manager may compare whether the communication channel in the interaction event matches one of the communication channels described by any one of the defined sequence types. If the interaction event's communication channel does not match any sequence type 316, then the next interaction event is read in step 311. If the interaction event's communication channels match one of the sequence types 314, then the sequence manager in step 318 may load (e.g. transfer to and/or store in) a subset of a customer history table relevant to the customer involved in the evaluated interaction event. The subset may include interaction events associated with the relevant customer and which occurred within a maximum time frame defined by the sequence types (e.g., a start time of each of the interaction events in the subset may be within the maximum time frame). For example, if two sequence types are defined based on a time frame of 3 days and a time frame of 5 days respectively, then the maximum time frame may be 5 days. The sequence manager may not need to evaluate all the historical interaction events for a customer, which may include events from previous years. By loading or retrieving a subset of the customer history table, the sequencing manager can reduce processing time and memory usage. Using the subset of interaction events and the received batch of interaction events, the sequencing manager may, in step 320, determine whether any of the events match any of the time frames in the defined sequence types. If no (step 322), then the next interaction event may be read from the customer update table in step 311. If yes 324, then the contact reasons of the interactions events are evaluated in step 326. If the contact reasons of the interaction events match any of the defined sequence types 328, then the interaction events may be assigned to a sequence. If the contact reasons of the interaction events do not match 329 any of the defined sequence types, then the next interaction event from the customer update table may be retrieved or read in step 311. In general, all the new interactions in the customer update table may be read or looped through in steps 311 through 329, but previous interaction events from the customer history table may also be retrieved to determine whether a possible sequence exists. In step 330, after interaction events have matched the sequence types' contact reasons, time frame, and communication channels, the interaction events may be assigned to a sequence. The interaction events may be assigned with an existing sequence ID or a new sequence ID. The sequence ID may be, for example, a concatenation of the customer ID, sequence type ID, and a timestamp, and stored in a table, with associated column values referencing each interaction event identifier. Other ways of associating interaction events with sequences may be possible, such as using a linked list, array, or other data structure. In step 332, KPI's may be calculated or computed as new interaction events are added to sequences. In steps 330 and 332, the interaction events loaded from the customer history table subset may be looped through to determine whether sequences exist and to compute KPI's.

Figure 4:
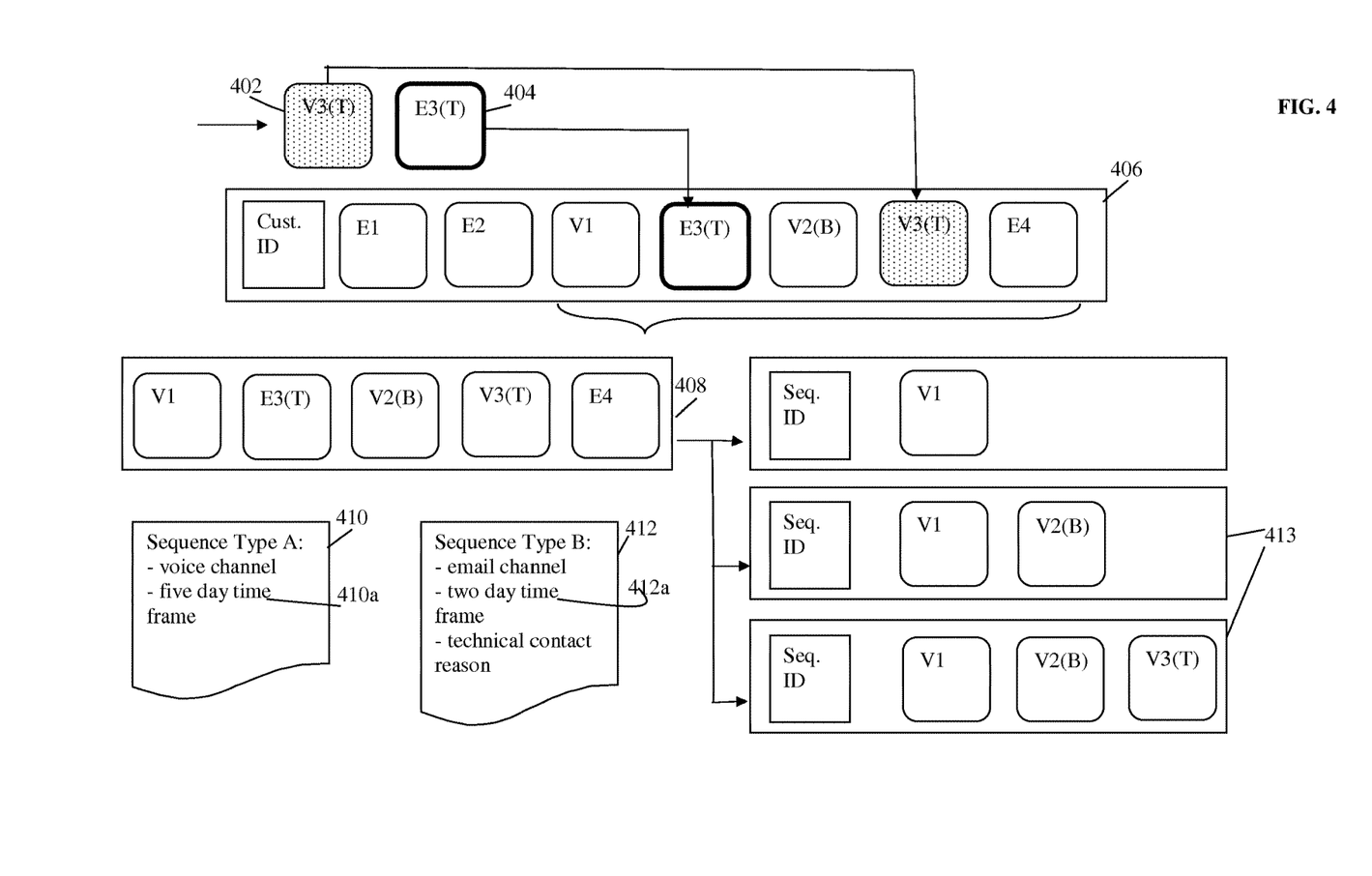
FIG. 4 is an illustration of building sequences from received interaction events, according to embodiments of the invention.

FIG. 4 is an illustration of building sequences from received interaction events, according to embodiments of the invention. An interactions service on a distributed computing system may receive, for example, two interaction events, an email interaction event 402 and voice interaction event 404. The interaction events may both involve or include the same customer. A customer history table 406 may be updated with the email interaction event 402 and voice interaction event 404, by inserting the events in the proper chronological place, according to start time, for example. The customer history table 406 may include all historical interaction events associated with a customer ID 408 identifying the same customer involved in the received interaction events 402 and 404. The historical interaction events may include, for example, other email interaction events and other voice interaction events.

A subset 408 of the customer history table may be loaded to build or generate a sequence. The subset 408 may be based on a maximum time frame of the defined sequence types 410 and 412. As shown, sequence type A 410 may be based on a 5 day time frame 410a and sequence type B 412 may be based on a 2 day time frame 412a. Thus, the maximum time frame may be 5 days.

Each of the interaction events in the subset 408 may be evaluated or compared against the defined sequence types 410 and 412. In sequence type A 410, a voice channel and a five day time frame may be specified. A sequence manager may assign interaction events that match the criteria of sequence type A 410. Initially, the sequence manage may assign a new sequence ID 413 with V1 414. Email interaction 3 416 may not be assigned to the sequence ID 413 because it does not match the voice channel requirement of sequence type A 410. Voice interaction V2 and V3 may further be assigned to sequence ID 413. Voice interaction V3 may include attribute "T" for a technical contact reason, and Voice interaction V2 may include attribute "B" for a billing contact reason. Since sequence type A 410 did not specify a required contact reason, the voice interactions may still be part of the same sequence.

Sequence type B 412 requires email communication, a 2 day time frame and a technical contact reason in interaction events. Email interaction events E3 and E4 may not be assigned to a sequence because they do not comport or match with sequence type B's 412 or sequence type A' 410 requirements.

Figure 5:
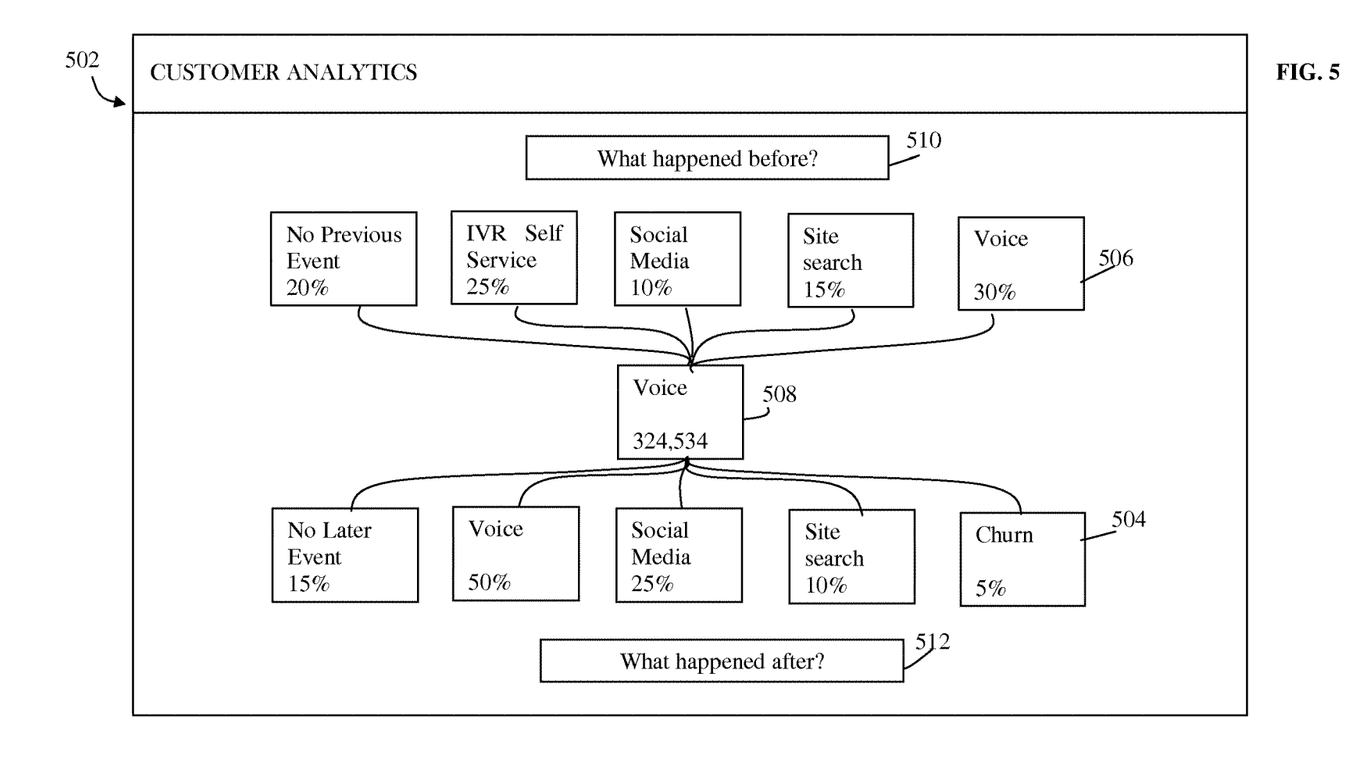
FIG. 5 is a graphical user interface presenting customer sequence data, according to embodiments of the invention.

FIG. 5 is a graphical user interface presenting customer sequence data, according to embodiments of the invention. A customer journey user interface (UI) 502 may show the channel deflection of customers based on the created sequences from interaction data. With this UI 502, an analyst can see for example, that 5% of the calls going through the Voice channel are ending with a Churn interaction 504, or a refusal of further business by the customer (e.g., the customer unsubscribes from a cable company). The sequence engine provides a sequence path for the sequences, for example a sequence path may be composed of these sessions: Voice 506 to Voice 508 to Churn 504. Further, the UI 502 may include two buttons: 'What happened before?' 510 and 'What happened after?' 512. A user may click these if further sequencing information should be viewed. Other UI's based on customer sequence data may include reports that describe weekly KPI calculations and improvements or regression in performance.

KPI calculations may include the following, for example:

Is event repeated: Indicates whether an event had already occurred. The implementation may be for voice interactions, if the agent transferred the call to another agent within 2 days then the second call (event) is marked with 'is repeated'

Is last in sequence: Indicates if the session is the last session in the sequence Sequence NCP (Next Contact Prevention): Indicates whether there is a Next Contact Prevention occurrence in the sequence. The out-of-box implementation is for voice interactions, if there are two consecutive sessions which has different top contact reason then the sequence is marked as NCP sequence Is sequence self service: Indicates whether the customer visited a self-service channel in the sequence. The implementation may check if the customer visited the IVR channel or the web channel then mark the sequence with 'is self-service'

Place in sequence by channel: Calculate the index of each session in the sequence according to the session channel. For example a sequence of Voice/Email/Voice, the place of the last Voice is 2 in the (channel) Voice only sequence Other KPI's may be further calculated.

Figure 6:
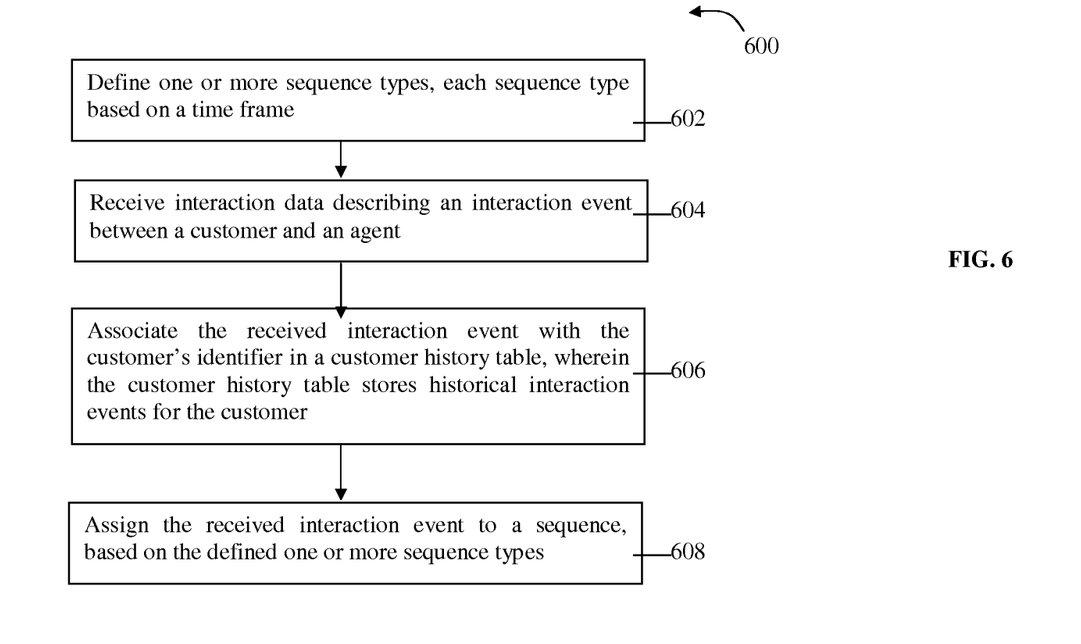
FIG. 6 depicts a flow chart illustrating a method of generating sequences, according to embodiments of the invention.

FIG. 6 is a flowchart illustrating a method 600 of generating sequences, according to embodiments of the invention. In operation 602, a system may define one or more sequence types, based on, for example a time frame. The sequence types may be define, described, or expressed by XML files that are associated with schemas that hierarchically define attributes or characteristics of interactions. The sequence type may be defined through user input on a computing device with a processor and memory. The system may further include a distributed computing system including a plurality of computing nodes, which may receive interaction data describing an interaction event between a customer and agent in operation 604. The interaction event may be segment or fragment of an interaction session, or the interaction event may represent a whole interaction. The interaction event may include processed attributes or characteristics of an interaction, such as the communication channel, time stamp, length of time, topic summary, or sentiment analysis.

In operation 606, one or more of the computing nodes may associate the received interaction event with the customer's identifier in a customer history table. The customer history table may store historical interaction events for the customer. The received interaction event may be, for example, added to the events associated with the customer ID and placed in chronological order. The computing nodes may load or retrieve a subset of the customer history table. The subset may include interaction events associated with the customer ID that occur within a maximum time frame defined by the sequence types. For example, if a maximum time frame is five days, the subset may only include interactions occurring in the past five days. Alternatively, a subset may explicitly defined as a month of interaction events for a customer.

In operation 608, one or more of the computing nodes may assign the received interaction event to a sequence, based on the defined one or more sequence types. For example, using the retrieved subset of interaction events, the computing nodes may only need to analyze the characteristics and attributes of interactions that occur within the maximum time frame, instead of analyzing every interaction in a customer's history. Beyond the maximum time frame, interactions may not be relevant for sequencing. The sequence types may describe at least one characteristic or attribute of interaction events that belong to a sequence, such as a communication channel, a time frame, or a contact reason. The sequence type may further define or describe logic such as multiple communication channels, or a particular order of contact reasons, for example.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method of generating a sequence of interactions, comprising:

defining, by a processor, one or more sequence types, each of the one or more sequence types based on a time frame and associated with one or more customers via a unique customer identifier;

receiving, by a distributed computing system comprising a plurality of computing nodes running a distributed database on distributed processors and distributed memory, a batch of interaction data describing interaction events between the one or more customers and an agent, sorting, by the distributed computing system, the received batch of interaction data into groups of interaction events, wherein each group is associated with a corresponding unique customer identifier of the one or more customers;

storing the sorted groups of interaction events in a customer history table based on the customer identifier, wherein the customer history table stores historical interaction events for each of the one or more customers; and for each customer identifier in the customer history table:
  a) for each received interaction event:
    if the particular received interaction event matches one or more sequence types associated with the current customer identifier, loading a subset of the historical interaction events associated with the current customer identifier that are within the corresponding time frame,
  b) assigning each loaded subset of historical interaction events and the particular received interaction event to a sequence for the particular customer identifier.

2. The method of claim 1, wherein a sequence includes a sequence identifier associated with one or more interaction events involving the customer, wherein the one or more interaction events are ordered chronologically and occur within a defined time frame of a sequence type.

3. The method of claim 1, comprising further defining a sequence type based on a communication channel.

4. The method of claim 1, comprising further defining a sequence type based on a contact reason.

5. The method of claim 1, further comprising determining an additional sequence for the customer associated with the customer's identifier by retrieving a subset of previous interactions events from the customer history table, wherein the subset includes interaction events occurring within a maximum time frame of the defined one or more sequence types; and
  comparing attributes of the retrieved subset of previous interactions with attributes described by a defined sequence type.

6. The method of claim 1, comprising calculating key performance indicators over the sequences.

7. The method of claim 1, comprising storing the interaction data and the sequence in a distributed file system.

8. The method of claim 1 wherein the distributed database is implemented using HBase.

9. The method of claim 1 wherein the distributed database is a No-SQL database.

10. A system comprising:
  at least one processor configured to define one or more sequence types, each sequence type based on a time frame, and associated with one or more customers via a unique customer identifier; and
  a distributed file system running a distributed database on distributed processors and distributed memory comprising a plurality of processors on a plurality of computing nodes, wherein the processors are configured to:
    receive a batch of interaction data describing interaction events between the one or more customers and an agent;
    sort the received batch of interaction data into groups of interaction events, wherein each group is associated with a corresponding unique customer identifier of the one or more customers;
    store the sorted groups of interaction events in a customer history table based on the customer identifier, wherein the customer history table stores historical interaction events for each of the one or more customers; and
    for each customer identifier in the customer history table:
      a) for each received interaction event:
        if the particular received interaction event matches one or more sequence types associated with the current customer identifier, load a subset of the historical interaction events associated with the current customer identifier that are within the corresponding time frame,
      b) assign each loaded subset of historical interaction events and the particular received interaction event to a sequence for the particular customer identifier.

11. The system of claim 10, wherein a sequence includes a sequence identifier associated with one or more interaction events involving the customer, wherein the one or more interaction events are ordered chronologically and occur within a defined time frame of a sequence type.

12. The system of claim 10, wherein the at least one processor is configured to define a sequence type based on a communication channel.

13. The system of claim 10, wherein the at least one processor is configured to define a sequence type based on a contact reason.

14. The system of claim 10, wherein the plurality of processors are configured to determine an additional sequence for the customer associated with the customer's identifier by retrieving a subset of previous interactions events from the customer history table, wherein the subset includes interaction events occurring within a maximum time frame of the defined one or more sequence types; and comparing attributes of the retrieved subset of previous interactions with attributes described by a defined sequence type.

15. The system of claim 10, wherein the plurality of processors are configured to store the customer history table and the sequence to a distributed database.

16. An apparatus, comprising:
  at least one processor configured to define one or more sequence types, each sequence type based on a time frame, and associated with one or more customers via a unique customer identifier; and
  a distributed file system running a distributed database on distributed processors and distributed memory comprising a plurality of processors on a plurality of computing nodes, wherein the processors are configured to:
    receive a batch of interaction data describing interaction events between the one or more customer and an agent;
    sort the received batch of interaction data into groups of interaction events, wherein each group is associated with a corresponding unique customer identifier of the one or more customers;
    store the sorted groups of interaction events in a customer history table based on the customer identifier, wherein the customer history table stores historical interaction events for each of the one or more customers; and
    for each customer identifier in the customer history table:
      a) for each received interaction event:

if the particular received interaction event matches one or more sequence types associated with the current customer identifier, load a subset of the historical interaction events associated with the current customer identifier that are within the corresponding time frame, b) assign each loaded subset of historical interaction events and the particular received interaction event to a sequence for the particular customer identifier.

17. The apparatus of claim 16, wherein each sequence type is further based on a communication channel or a contact reason.

18. The apparatus of claim 16, wherein the customer history table stores previous interaction events sorted by customer in chronological order.

19. The apparatus of claim 16, wherein each of the generated sequences includes a sequence identifier associated with one or more interaction events involving at least one customer, wherein the one or more interaction events are ordered chronologically and occur within a defined time frame of a sequence type.

20. The apparatus of claim 16, wherein relevant customers are customers described in the received data.

* * * * *